June 19, 1923. W. C. HADLEY. Re. 15,629

AMUSEMENT DEVICE.

Original Filed Aug. 20, 1920

2 SHEETS—SHEET 1.

WITNESSES

Olivia K. Holmes

A. Hush Anderson

INVENTOR

WALTER C. HADLEY

BY Munn & Co.

ATTORNEYS

June 19, 1923. W. C. HADLEY. Re. 15,629

AMUSEMENT DEVICE.

Original Filed Aug. 20, 1920

2 SHEETS—SHEET 2.

WITNESSES

Owen H. Holmes

Albert Anderson

INVENTOR

WALTER C. HADLEY

BY Munn & Co.

ATTORNEYS

Reissued June 19, 1923. Re. 15,629

UNITED STATES PATENT OFFICE.

WALTER C. HADLEY, OF NEW YORK, N. Y., ASSIGNOR TO CENTRAL TALKING MACHINE SHOP, INC., OF NEW YORK, N. Y., A CORPORATION OF NEW YORK.

AMUSEMENT DEVICE.

Original No. 1,431,891, dated October 10, 1922, Serial No. 404,969, filed August 20, 1920. Application for reissue filed May 10, 1923. Serial No. 638,355.

*To all whom it may concern:*

Be it known that I, WALTER C. HADLEY, a citizen of the United States of America, and a resident of New York city, borough of Manhattan, county and State of New York, have invented a new and useful Improvement in Amusement Devices, of which the following is a specification.

The present invention relates to amusement devices intended for use in connection with automatic pianos.

The object of the invention is to provide a device made of some suitable light material carrying upon one face a pictorial representation of a comical or grotesque figure or animal and preferably having upon its lower end projections simulating feet, the feet being spaced apart so as to rest upon the projecting ends of two keys of a piano so that as the keys rise and fall the device will be tilted or agitated producing a dancing effect.

A further object of the invention is to provide a plurality of such devices designed to be supported by the projecting ends of the keys of an automatic piano in close relation to each other, each carrying a figure upon one of its faces. A further object is to provide means whereby the tilting movement of the devices will produce a rattling sound simulating the effect produced by castanets. A further object of the invention is to provide a simulated stage and proscenium to fit over the black and white keys of a piano to enclose the dancing devices.

To the above ends the invention may be said to consist primarily of a device having upon one face a figure.

It further consists of such a device provided with projections at its lower end simulating feet, said projections being spaced apart to rest upon two keys and further of a plurality of such devices combined with sound producing means and further of a combination of such devices with a simulated stage and theatre, and further of the devices and combinations of devices, which will be hereinafter described and claimed.

The invention is illustrated in the accompanying drawings, in which.

A similar reference of characters employed throughout the specification and drawings to designate corresponding parts will be employed.

Figure 6:
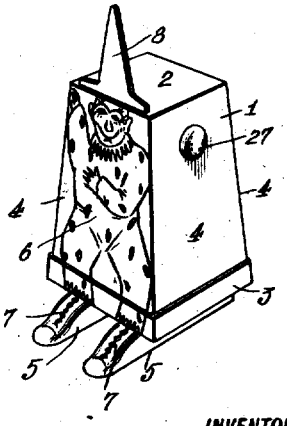
Fig. 6 is a perspective view of one of the blocks.
Figure 5:
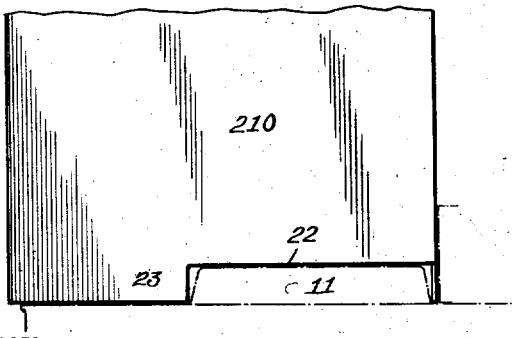
Fig. 5 is a side elevation of the lower part of one end of the theatre.

The blocks 1 are provided with a top 2, base 3 and sides 4, and they may be made of any suitable light material, preferably of cardboard, and as indicated in Fig. 6, the sides 4 taper or converge from the base 3 to the top 2, thus while the block is rectangular in form in cross-section, and also has flat faces, it is what might be called wedge shaped. The base will be substantially the width of two of the white keys of a piano and upon its under surface it will be provided with the projections 5, arranged parallel to each other and extending from the front to the back, and projecting at the front. They will also be spaced apart so that they will rest upon adjacent white keys substantially in the centre of the key, as clearly indicated in Figs. 1, 2 and 3.

Figure 1:
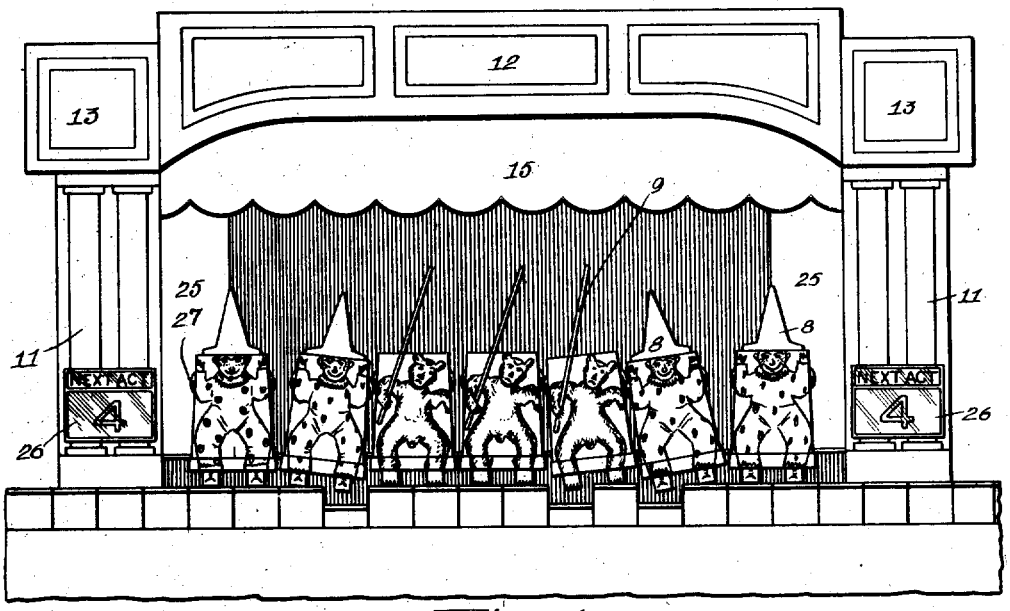
Figure 1 shows in front elevation the simulated theatre with a plurality of devices in the form of blocks therein, the whole resting upon the keys of a piano, and illustrating the operation.
Figure 2:
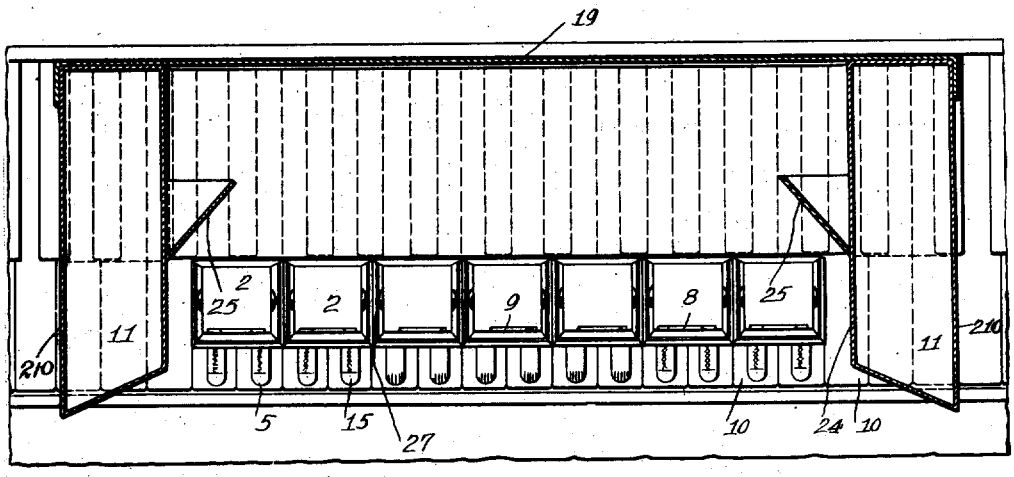
Fig. 2 is a horizontal cross-section through the theatre with the blocks shown in top-plan view.

Upon one face each block will be provided with a pictorial representation of a figure as indicated at 6, which may be a human or an animal figure, as indicated in Figs. 1 and 6, and the upper surfaces of the projections 5, where they project beyond the front face of the block, will be ornamented as at 7, to indicate the shoes or the feet or paws of the figure dependent upon whether a human figure or an animal figure is shown.

In some instances a tapered panel 8 will be affixed to the top 2 at or near the front edge simulating a hat, and in some instances a projection 9 will be extended upwardly, as indicated in Fig. 1 simulating a wand or gun carried by the figure. The projections 5 from back to front are of a length substantially equal to the distance the white keys 10 project beyond the black keys 11, (see Fig. 3), so that when the blocks are placed upon the white keys, they will be positioned in alignment with each other by the contact of their rear faces with the forward ends of the black keys.

From the foregoing it will be observed that when such a block or plurality of blocks are placed upon the projecting ends of the white keys with the projections 5 of each block resting upon adjacent white keys, the up and down movement of the keys, by the automatic mechanism of the piano, will cause the blocks to rock from side to side simulating the dancing of the figures thereon.

It will, of course, be understood that the blocks in and of themselves constitute a complete and operative toy, but for a better effect and to simulate a theatrical act, a simulated stage and proscenium may be employed therewith.

This stage or proscenium consists of the two side members 11 and a connecting member or arch 12. This device is manufactured of any suitable light material, preferably of cardboard and may be fastened together in any suitable manner.

Figure 3:
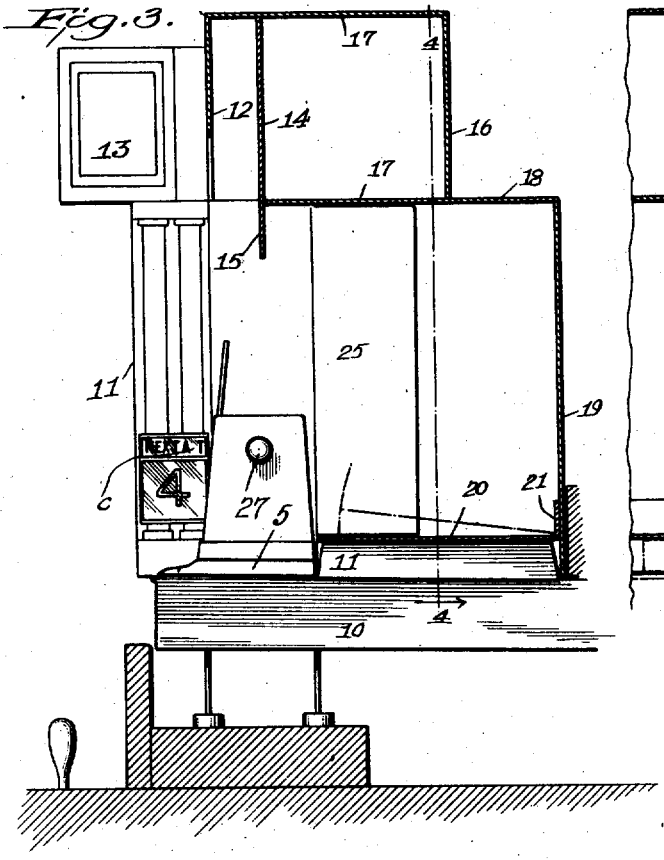
Fig. 3 is a vertical cross-section with one of the blocks shown in side elevation.
Figure 4:
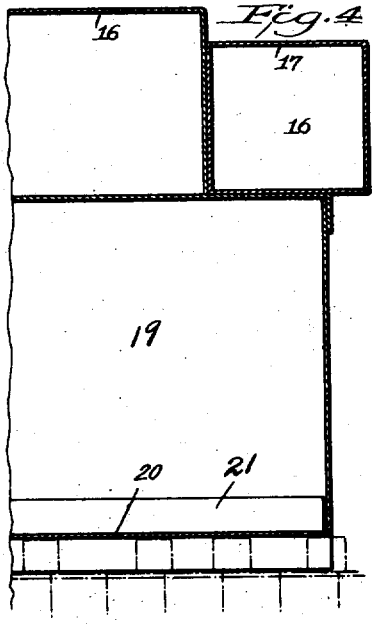
Fig. 4 is a vertical section taken on a line 4, 4, in Fig. 3 and looking in a direction of the arrow in that figure.

The side members 11 at their upper ends 13 project beyond the arch 12, as indicated in Fig. 3. At the rear of the arch 12 will be positioned a strip 14 which drops below the arch 12 simulating a drop or curtain 15. (See Figs. 1 and 3). A back piece 16 and a top 17 are employed to lend strength and rigidity and extend from left to right. A partition 17 forms the top of the structure and it projects at the rear beyond the back piece 16, as shown at 18, and is provided with a back 19. A stage strip 20 has an upturned flange 21, which is secured upon the inner surface of the back 19, and extends across the structure between the sides or end members 11, and is secured by a suitable adhesive to the inner surface of the back 19 at such a distance above the base thereof that it will rest upon the black keys 11, as indicated in Fig. 4; the forward edge of the stage strip 20 terminating on a line with the front ends of the black keys 11.

This stage strip 20 cooperates with the ends of the black keys in holding the row of blocks in proper alignment forming a back stop, as it were. Side pieces 210 extend forward at each end joining the end members 11, and these side pieces at their lower ends are notched or cut out, as indicated at 22, forming a recess fitting over a black key 11, and at their forward ends projections 23 to rest upon the white keys.

While I have described the construction of the theatre construction with considerable detail, it is, of course, understood that it is only essential that it combine a simulated proscenium and stage, so constructed as to rest upon the black and white keys in position to enclose the row of dancing blocks, and that any suitable construction may be adopted in lieu of that illustrated and described which will sufficiently insure the necessary strength and rigidity.

Preferably the side members 11 will be provided with inner partitions or walls 24 and projecting inwardly therefrom are inclined strips 25 simulating wings or scenery.

The exposed part of the proscenium structure may be ornamented in any suitable manner as by simulated panels and pillars, as shown in Fig. 1, and the simulated drop 15 and wings 25 may also be suitably decorated; and also signs similar to announcement signs, as indicated at 26, may appear at the front of the end members 11.

In operation the simulated stage and proscenium are supported upon the black and white keys, the stage flap 20 covering the black keys and the forward lower ends 11 resting on the white keys, having been placed in position on the keys, the blocks may now be placed upon the white keys in close position to each other and the movement of the white keys up and down, as indicated in Fig. 1, causes a tilting or rocking movement of the blocks.

This rocking movement will cause the sides 4 to impinge or strike each other, and in order to utilize this function and produce a rattling sound such as produced by castanets, the opposite sides 4 of each block may be provided with small rounded metallic or wooden projections 27, so positioned that the projections on opposed sides of adjacent blocks will strike each other as the blocks rock towards each other.

Having described my invention, I claim:

1. An amusement device, comprising a block tapering from the base towards the top, a figure upon one face of the block and parallel projections upon the base of the block spaced apart from each other to rest upon two adjacent keys of a piano.

2. An amusement device, comprising a block the sides of which converge upwardly, a figure upon one face of the block, parallel projections upon the base of the block spaced apart from each other to rest upon two keys of a piano, and striking projections upon opposite sides of the block near the upper end.

3. An amusement device, comprising a block tapering from the base towards the top, a figure upon one face of the block and transveresly extending parallel projections upon the base of the block projecting at one end beyond one face of the block.

4. An amusement device, comprising a block tapering from the base towards the top, a figure upon one face of the block, said block at its base being substantially the width of two white keys of a piano and tapering from the base towards the top, and transversely extending parallel projections upon its base arranged to engage two adjacent white keys of a piano.

5. In an amusement device, in combination, a stage and proscenium having forwardly extending end members, means to support the same over the keys of a piano with the end members projecting forwardly at each end over the extending portion of the white keys, and a plurality of tapering blocks supported by the white keys within the projecting members of the proscenium in line with and in close relation to each other.

WALTER C. HADLEY.